July 16, 1940.  S. R. HOWARD  2,207,885
AUTOMATIC WEIGHING MACHINE
Filed May 12, 1936   11 Sheets-Sheet 1

INVENTOR
Stanley R. Howard
BY J. Stanley Churchill
ATTORNEY

July 16, 1940.  S. R. HOWARD  2,207,885
AUTOMATIC WEIGHING MACHINE
Filed May 12, 1936  11 Sheets-Sheet 3

INVENTOR
Stanley R. Howard
BY J. Stanley Churchill
ATTORNEY

July 16, 1940. S. R. HOWARD 2,207,885
AUTOMATIC WEIGHING MACHINE
Filed May 12, 1936 11 Sheets-Sheet 4

INVENTOR
Stanley R. Howard
BY J. Stanley Churchill
ATTORNEY

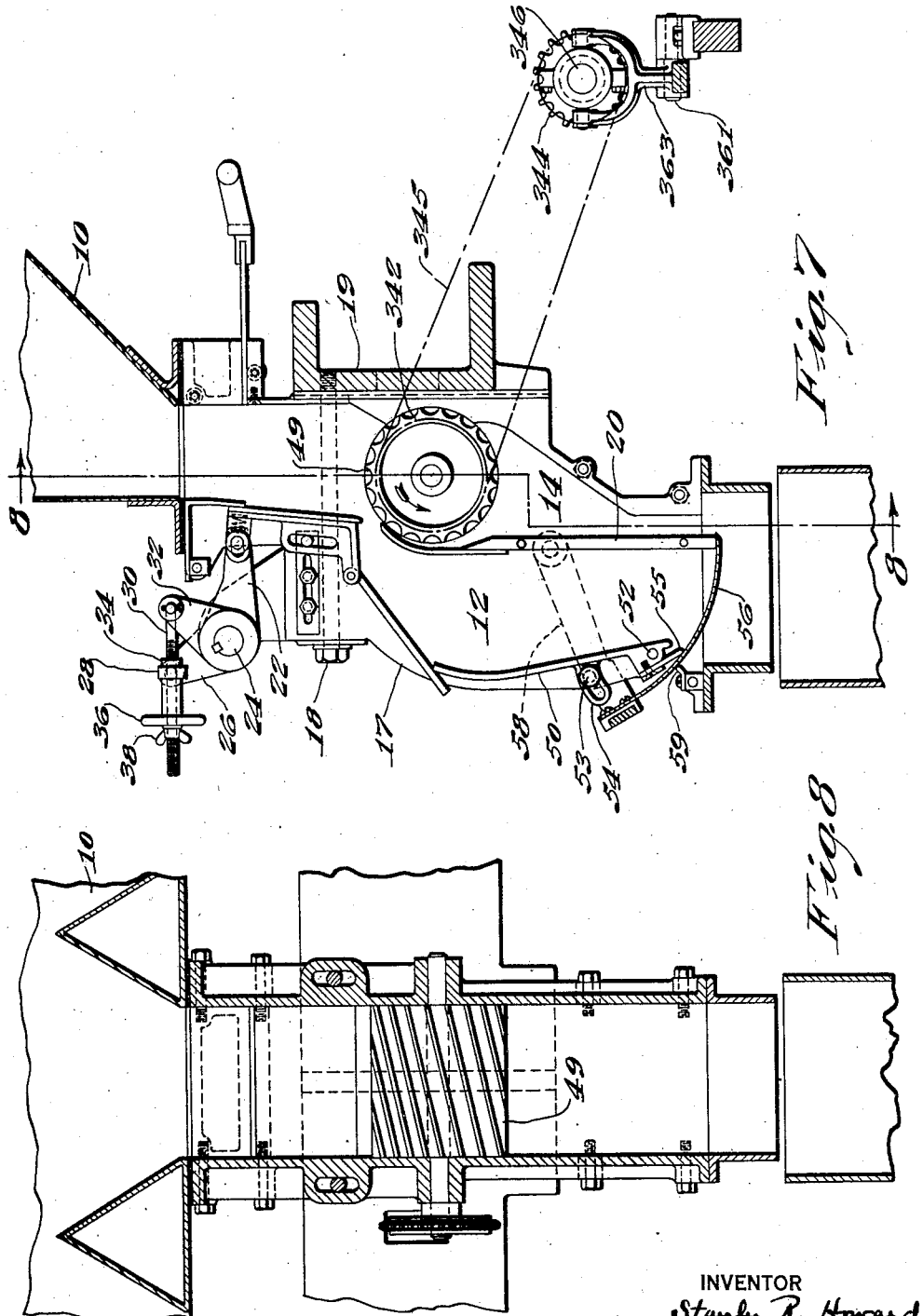

INVENTOR
Stanley R. Howard
BY J. Stanley Churchill
ATTORNEY

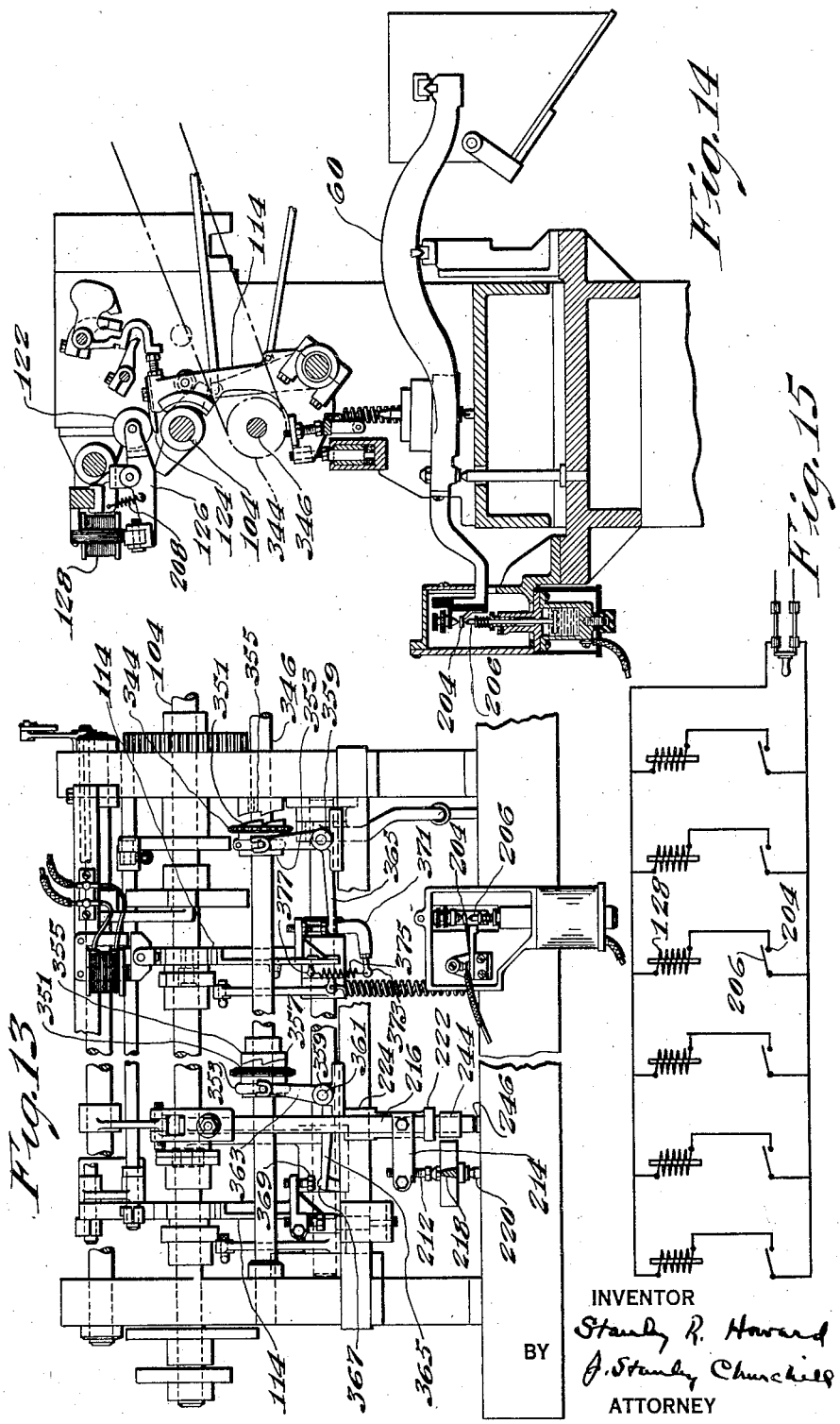

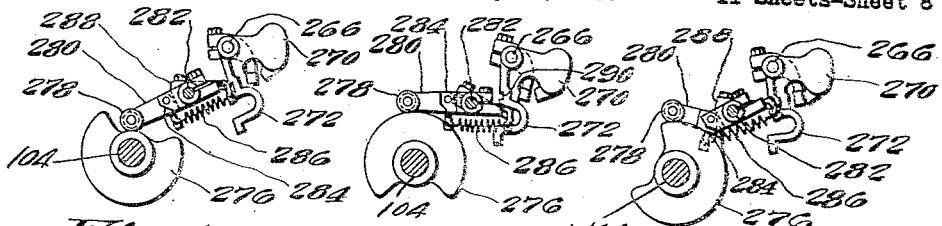
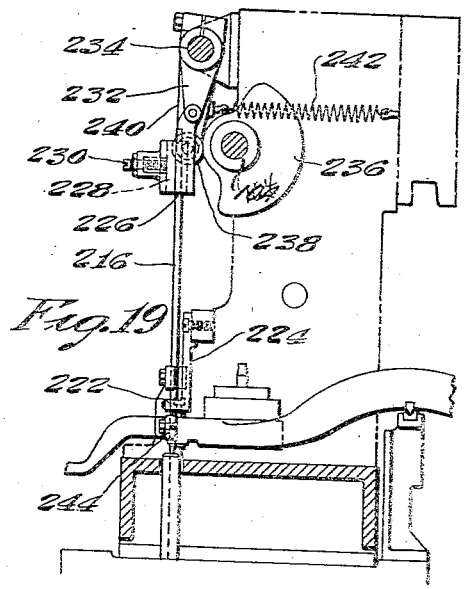
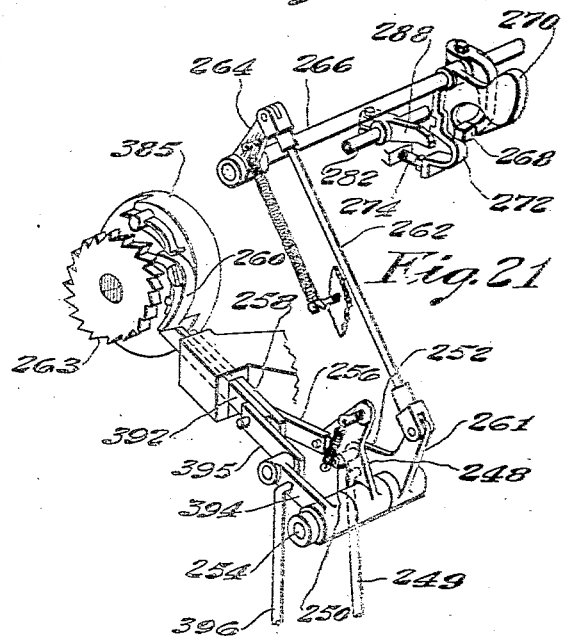
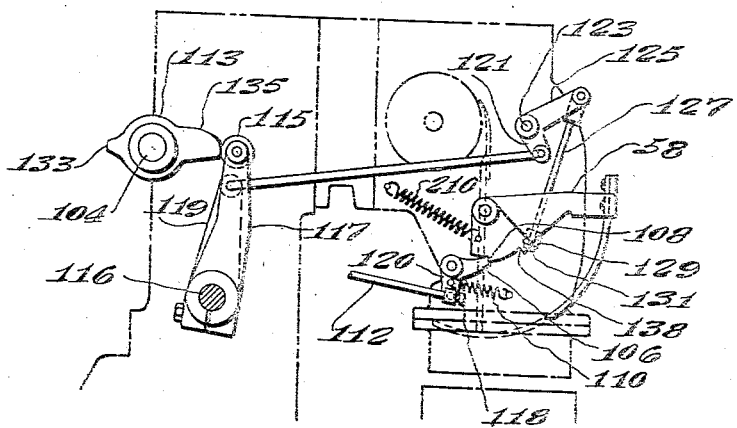

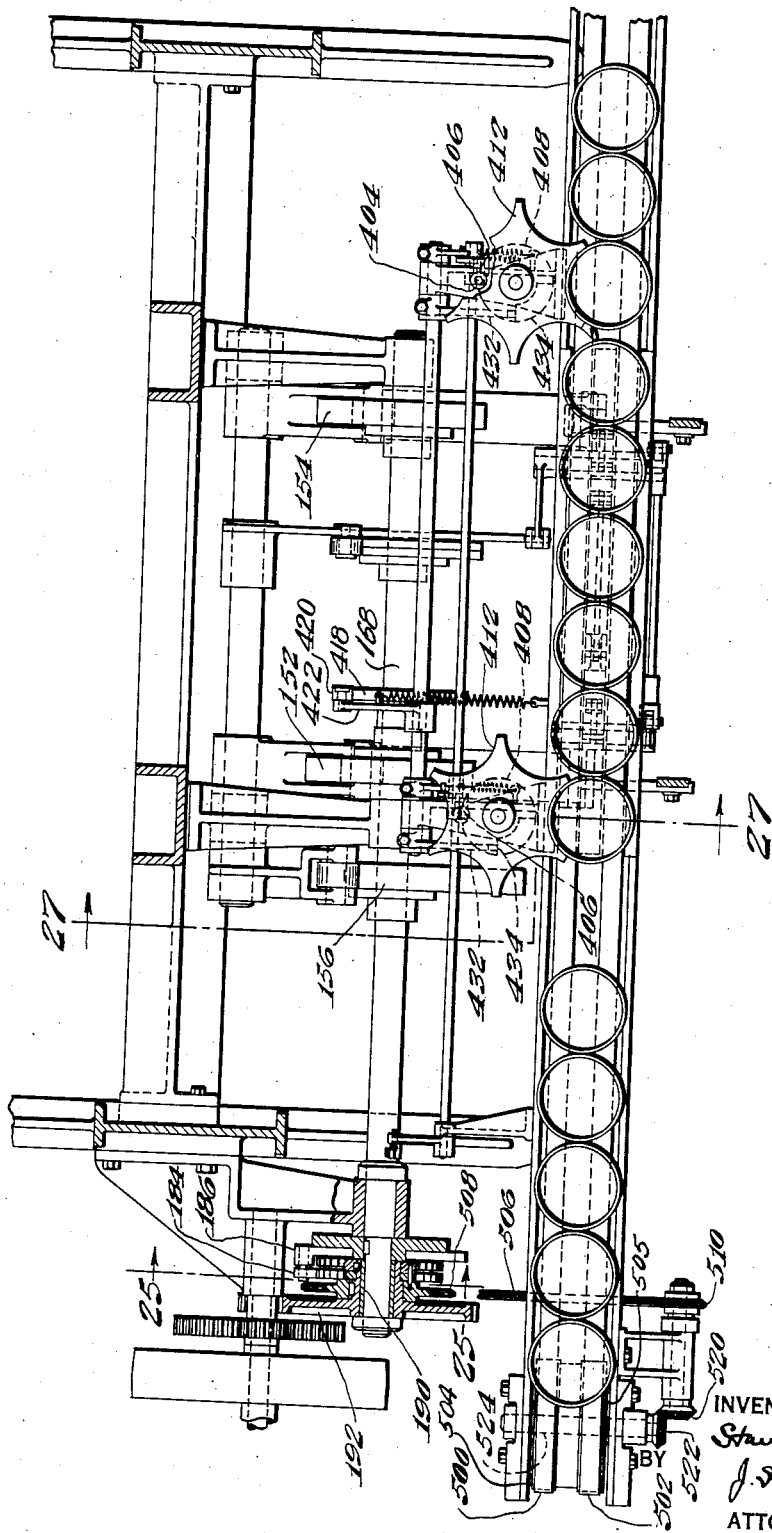

July 16, 1940.  S. R. HOWARD  2,207,885
AUTOMATIC WEIGHING MACHINE
Filed May 12, 1936  11 Sheets-Sheet 10
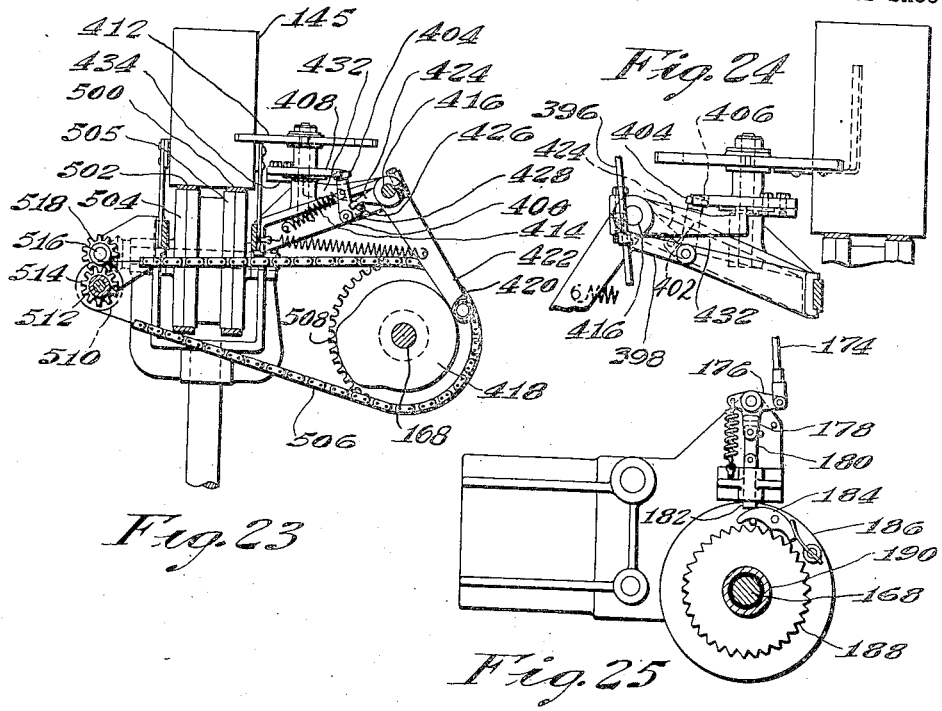
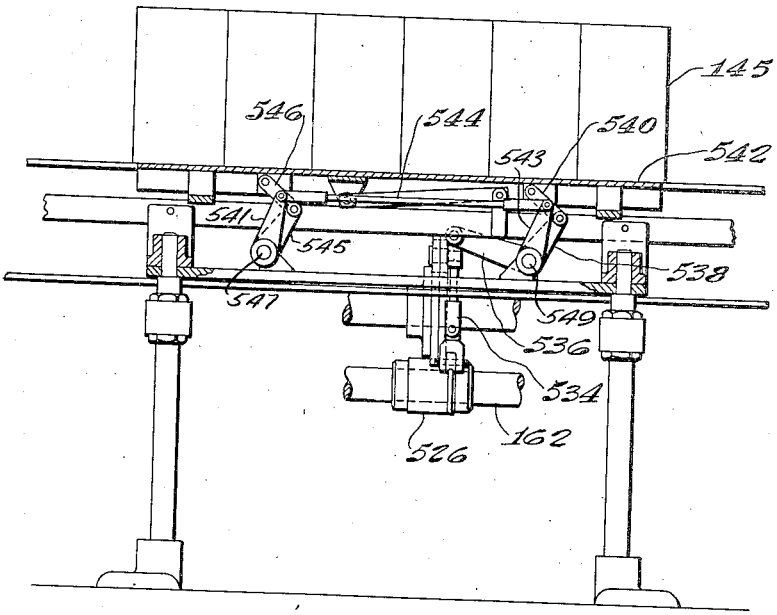
INVENTOR
Stanley R. Howard
BY J. Stanley Churchill
ATTORNEY Patented July 16, 1940

2,207,885

UNITED STATES PATENT OFFICE 2,207,885

AUTOMATIC WEIGHING MACHINE

Stanley R. Howard, Milton, Mass., assignor to Pneumatic Scale Corporation, Limited, Quincy, Mass., a corporation of Massachusetts Application May 12, 1936, Serial No. 79,253

17 Claims. (Cl. 249—18)

This invention relates to a packaging machine, and particularly to a weighing machine.

In general, the invention has for an object to provide a novel and improved weighing machine, and more particularly an automatic weighing machine which is adapted to handle, weigh and package flowable solid material in an efficient, rapid, accurate and economical manner.

With this general object in view, and such others as may hereinafter appear, the invention consists in the weighing machine and in the various structures, arrangements and combinations of parts hereinafter described and particularly defined in the claims at the end of this specification.

Figure 1:
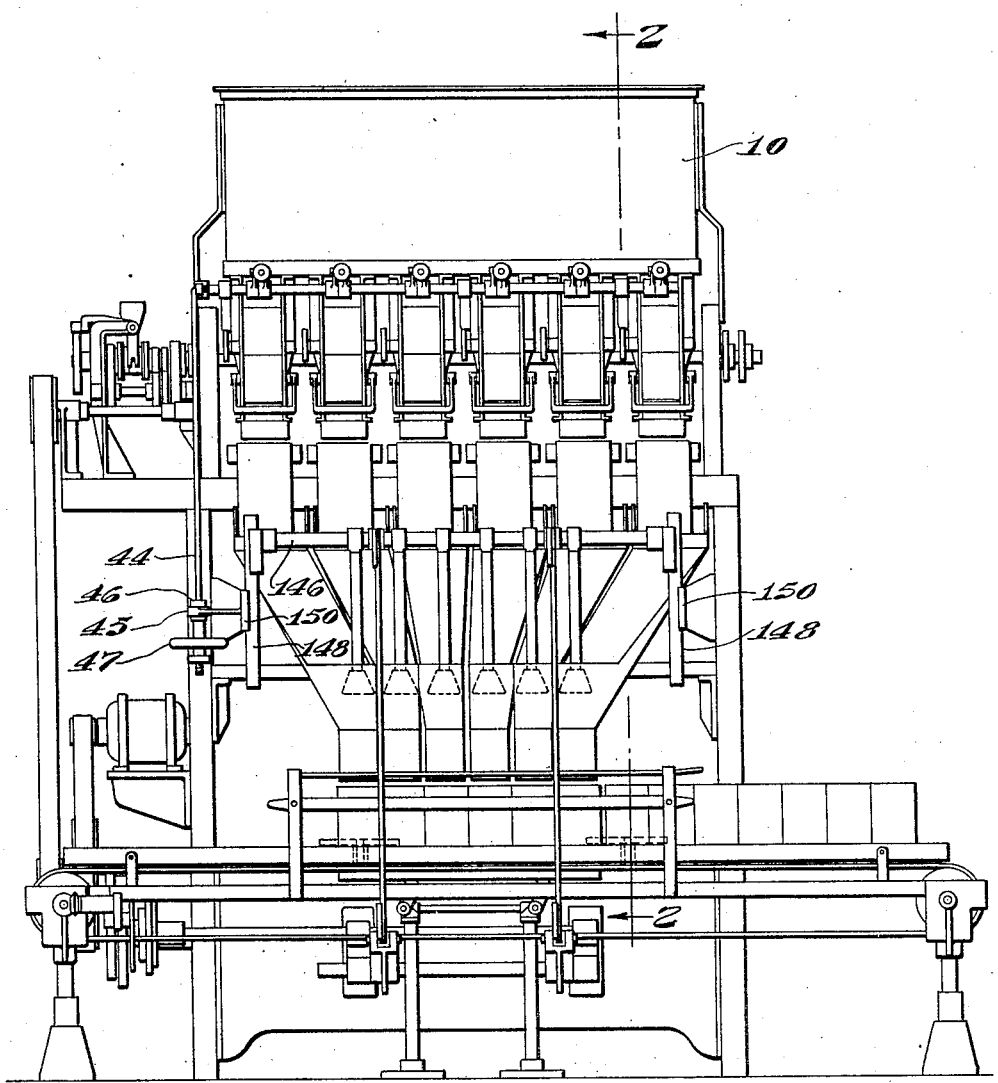
Figure 2:
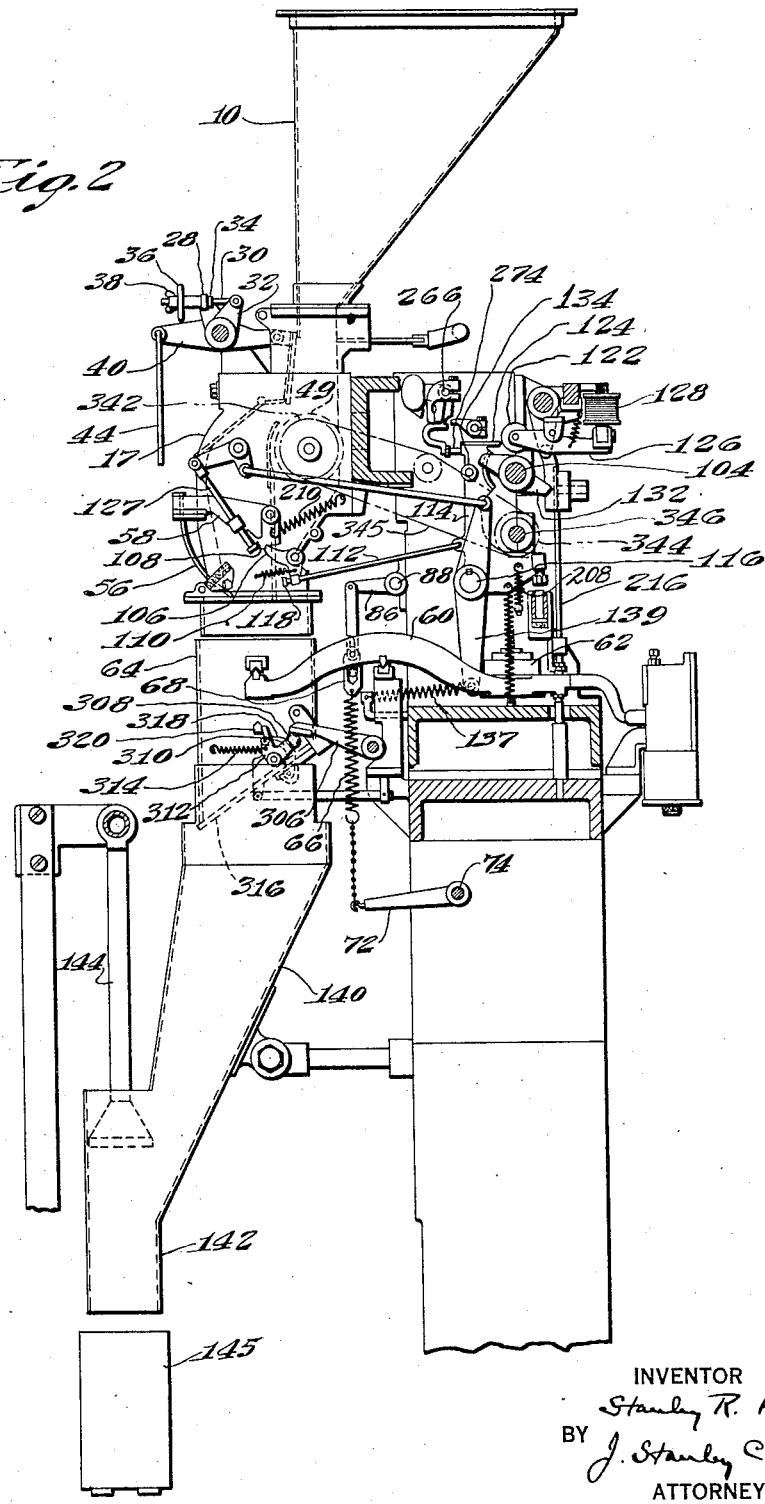
Figure 3:
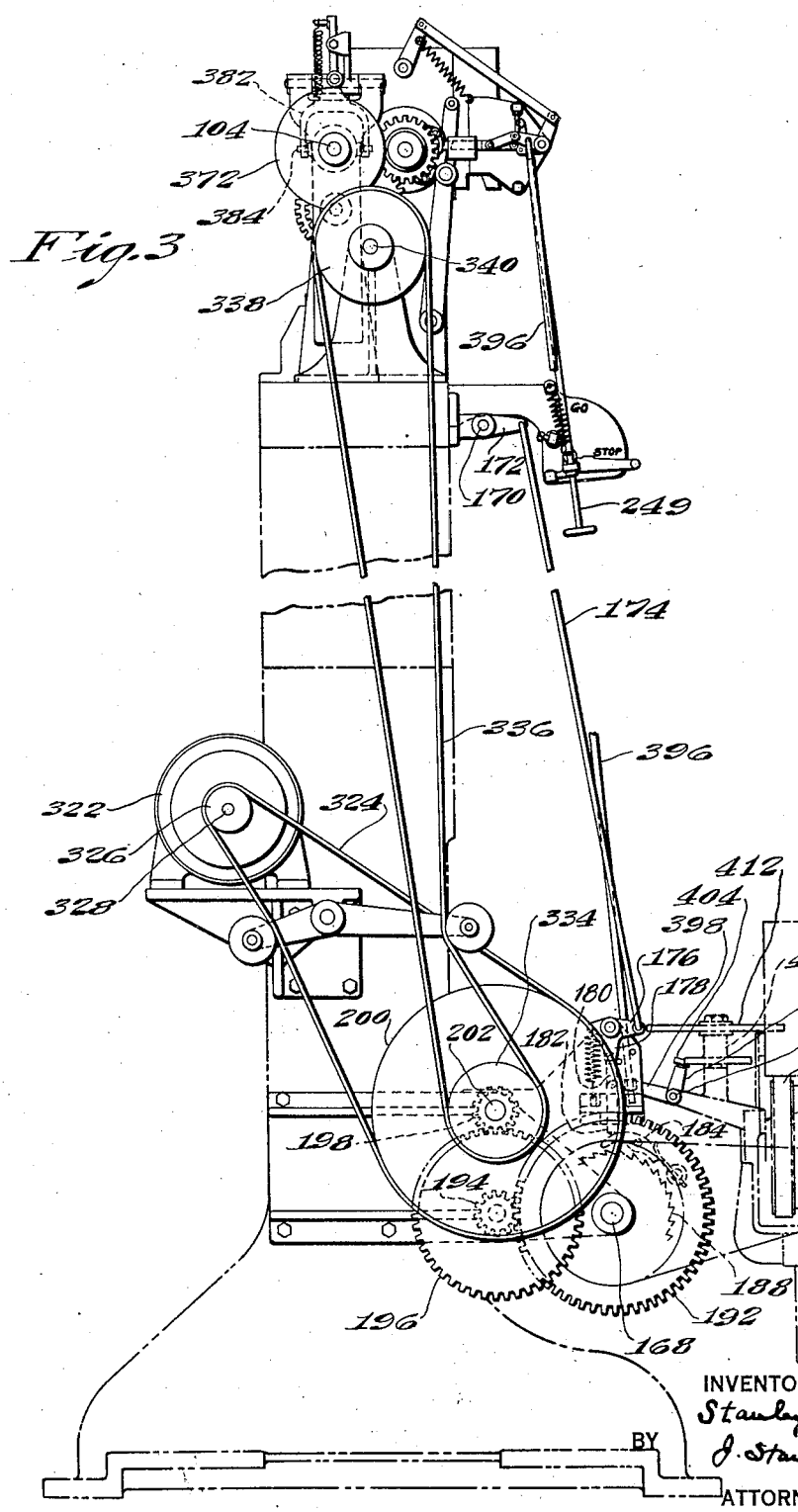
Figure 4:
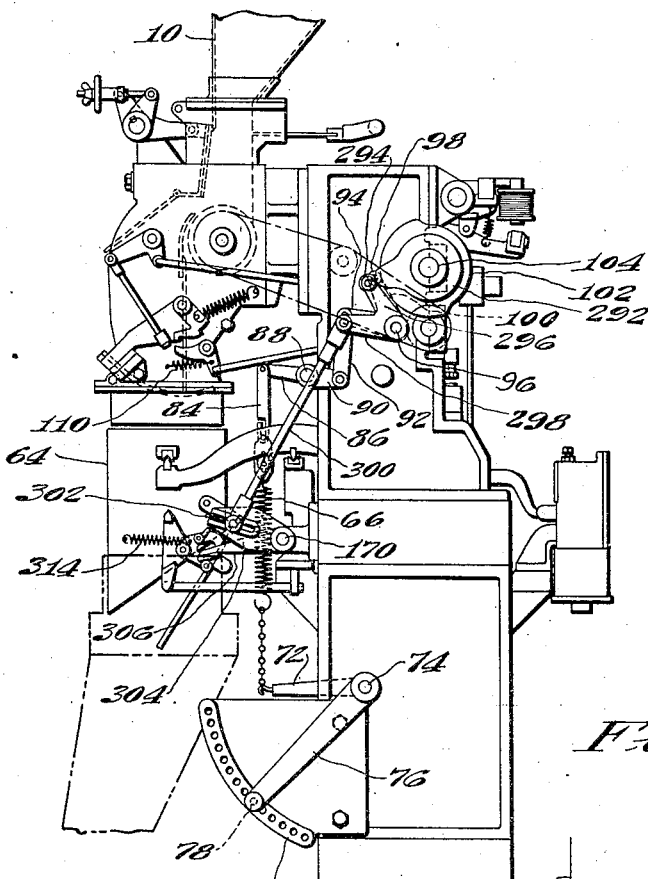
Figures 5, 6:
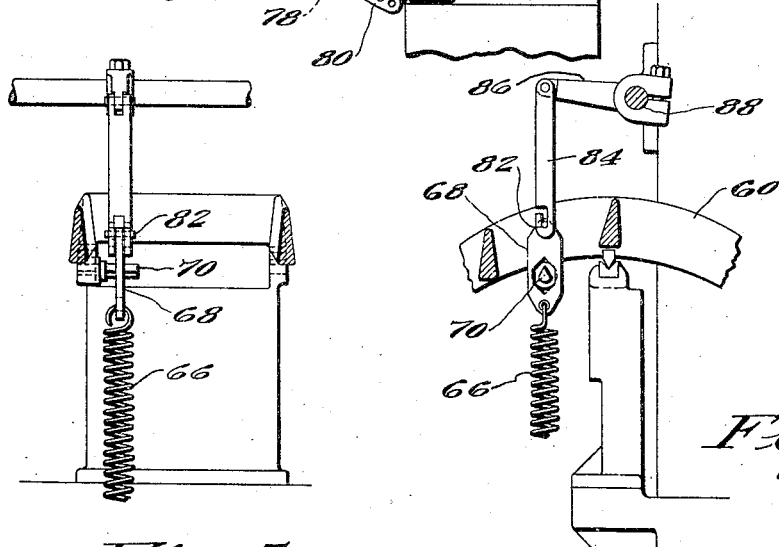
Figure 9:
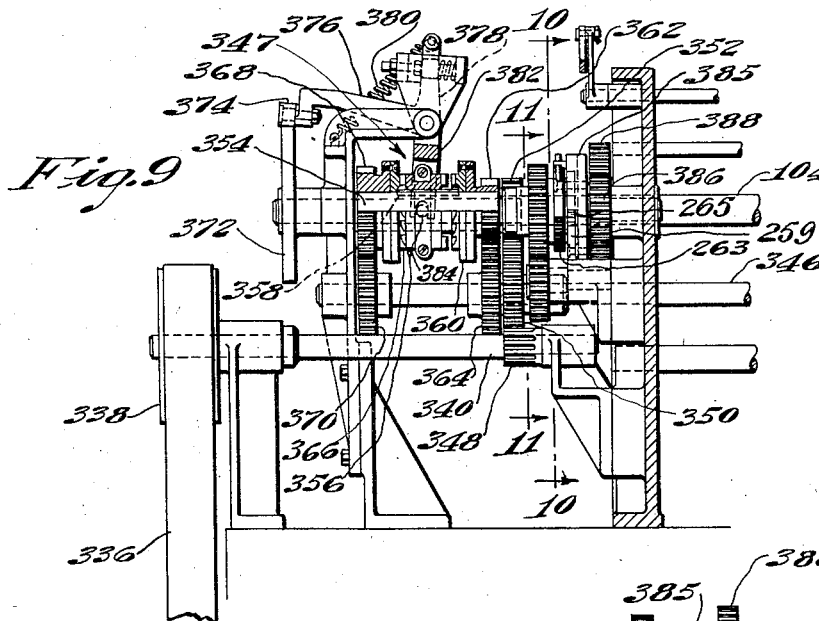
Figure 12:
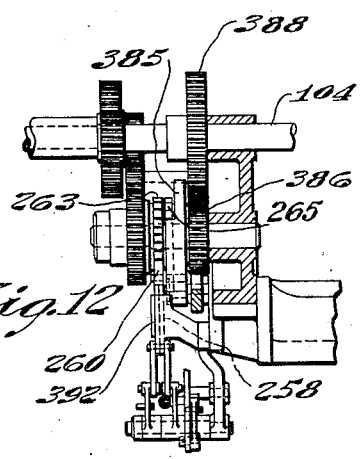
Figure 10:
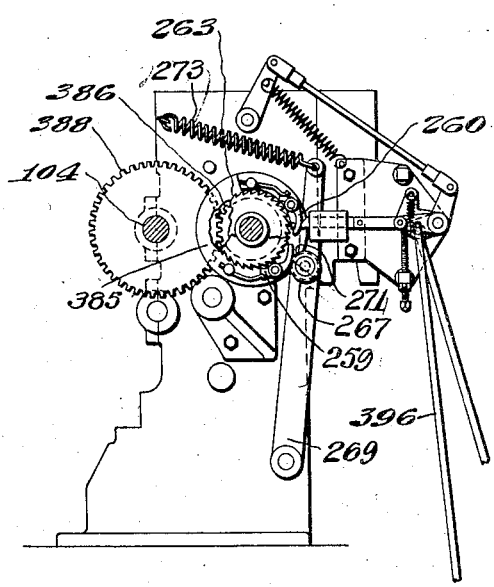
Figure 11:
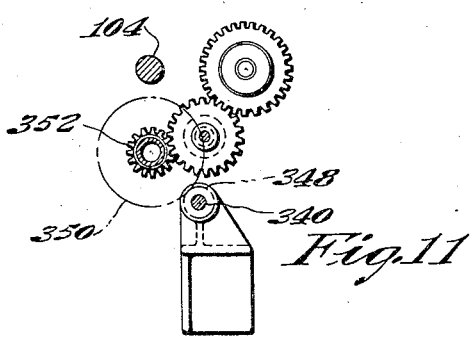
Figure 27:
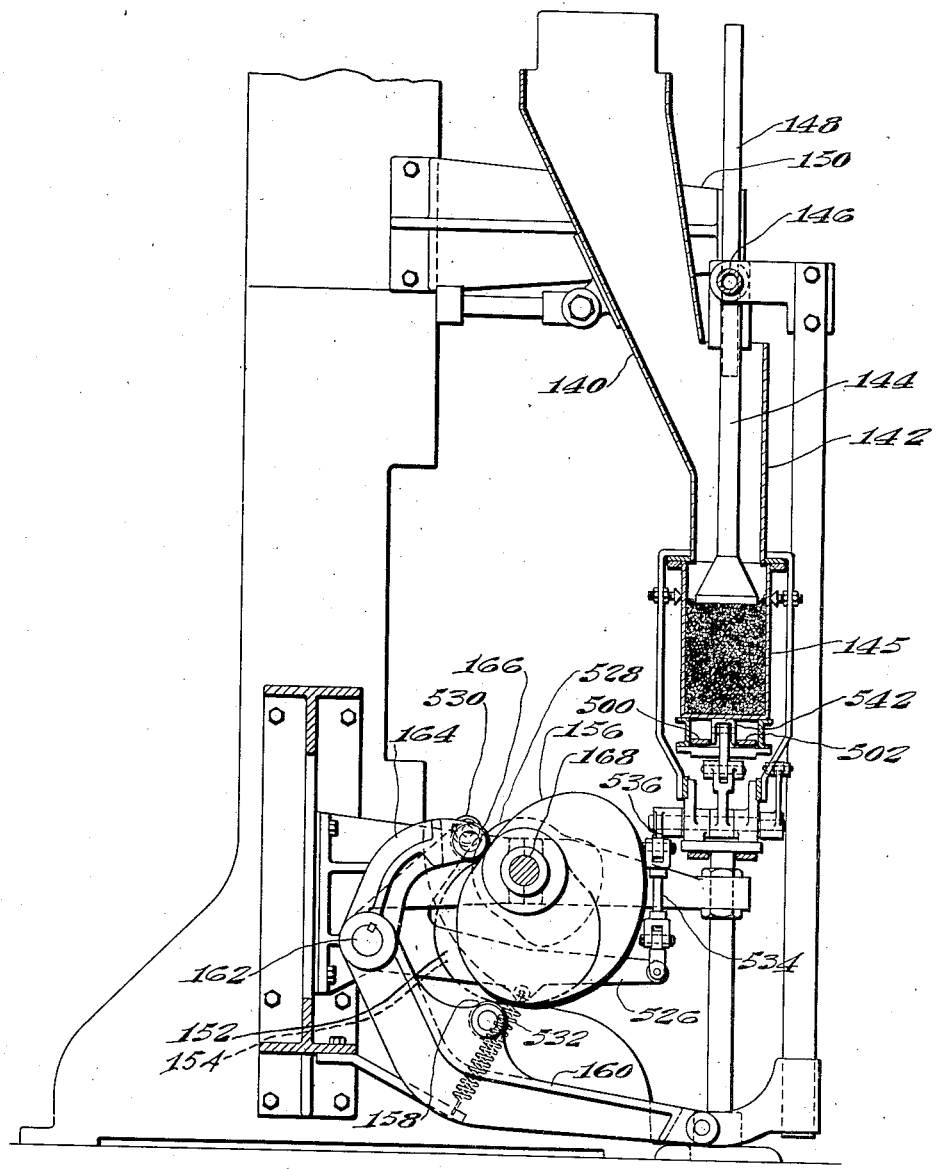

In the drawings illustrating the preferred embodiment of the invention, Fig. 1 is a front elevation of a machine embodying the present invention; Fig. 2 is a section taken on the line 2—2 of Fig. 1; Fig. 3 is a side elevation viewed from the left of Fig. 1, showing the driving mechanism; Fig. 4 is a partial side elevation viewed from the right in Fig. 1; Figs. 5 and 6 are front and side elevations respectively of a part of the weighing mechanism; Fig. 7 is an enlarged side elevation of the feed hopper with one side removed and some of the parts in section; Fig. 8 is a section on the line 8—8 of Fig. 7; Fig. 9 is an enlarged front elevation of the upper portion of the driving mechanism with some of the parts in section; Fig. 10 is a section on the line 10—10 of Fig. 9; Fig. 11 is a section taken on the line 11—11 of Fig. 9; Fig. 12 is a plan view of the pawl stop mechanism; Fig. 13 is a rear elevation of a portion of the machine illustrating operating and control mechanism; Fig. 14 is a detail in section illustrating the control and operating mechanism; Fig. 15 is a wiring diagram to be referred to; Figs. 16, 17, and 18 are detail views of the overload safety cam shown in different positions of operation; Fig. 19 is a detail view of the scale locking mechanism; Fig. 20 is a detail view of the shutter operating cam; Fig. 21 is a detail in perspective of the controlling clutch and pawl stops; Fig. 22 is a plan view of the conveyor; Figs. 23 and 24 are detail views of the safety device on the conveyor. Fig. 25 is a detail in section on the line 25—25 of Fig. 22; Fig. 26 is a detail in front elevation of a portion of the conveyor mechanism; and Fig. 27 is a section on the line 27—27 of Fig. 22.

Referring now to the drawings, in the illustrated machine six duplicate units are operatively mounted upon a frame. Each unit includes mechanism for withdrawing flowable solid material from a bulk supply and weighing the same. Each unit is further provided with mechanism for compressing the weighed load and introducing it into a container. The various operations of the weighing end of the machine are divided into two separate and distinct cycles in the operation of the machine, whereby the bulk load is weighed during the first cycle and the finished weight is performed during the second cycle, and the operation of the various units are so related that before the machine can start upon a succeeding cycle, each unit must have completed all of its own individual weighing operations. When the last scale has made its weight, during the second cycle the material is discharged by all of the units into the mechanism by which it is compressed and delivered into the containers. The compressing mechanism in the illustrated machine and the delivery of the material into the containers of the various units operate in timed relation.

In the illustrated machine each unit is provided with a scale beam arranged to control the flow of material from the hopper within which a bulk supply of the material to be weighed is stored. Provision is made for controlling the operation of each scale beam so as to enable two weighing operations to be performed by each beam. During the first weighing operation, a bulk stream and a drip stream of the material is permitted to flow from the hopper onto the scale and upon completion of this weighing operation the supply is cut off. During the second weighing operation, the drip stream only is permitted to flow onto the scale to complete the weight whereupon the supply is again cut off, as will be hereinafter more fully described. In its preferred form the invention contemplates the provision of a weighing machine having a scale beam, material feeding means, and control mechanism for controlling the operation of the material feeding means from the scale beam, together with operating means for causing these mechanisms to function at each cycle of operation of the machine, and the weighing machine is further provided with mechanism for discharging the finished load, mechanism for decreasing the effective counterweight upon the scale beam, and mechanism for varying the size of the stream of material being fed, together with operating mechanism for making these last mentioned mechanisms function at every other cycle of the machine, whereby the scale beam, material feeding means, and control mechanism, above referred to, may be utilized to weigh first the bulk load, and then the finished load. The different features of the invention may and preferably will be embodied in a multi-unit machine, as will be described. In the preferred and illustrated machine the several scales making up the multiple weighing machine are controlled in their action by a one revolution clutch which is permitted to make one revolution for each cycle of operation of the machine. The one revolution clutch is geared to the cam shaft at a ratio of 2 to 1 so that one revolution of the clutch will revolve the cam shaft one half a revolution. In the following description of the preferred embodiment of the invention, it will be understood that one cycle of operation will refer to one half a revolution of the cam shaft and that a complete revolution of the cam shaft is equivalent to two cycles of operation with reference to the one revolution controlling clutch. Thus during the first cycle of operation of the weighing machine, the bulk load is weighed, while during the second cycle of operation a relatively small increment of material is added to bring the bulk load to a predetermined finished weight.

Referring now to Figs. 2, 4, 7 and 8, 10 represents a storage hopper for the bulk supply of material to be weighed and from which the material flows by gravity downwardly into the bulk and drip stream passages of each unit indicated generally at 12, 14. The combined bulk and drip stream passages are formed within a U-shaped casting indicated at 17 which is secured by screw bolts 18 to a part of the machine frame indicated at 19 and a partition member 20 secured within the interior of the U-shaped casting serves to sub-divide the interior thereof into the drip stream chamber and the bulk stream chamber. The open face of the U-shaped casting is closed by adjustable plates and the partition member cooperates with a fluted feed drum to form and control the passage of the material into the drip stream chamber. As best illustrated in Figs. 7 and 8, the upper plate is supported upon one arm 22 of a bell crank loose upon a shaft 24, the second arm 26 of the bell crank being provided with a swivel connection 28 through a hole in which a threaded rod 30 is arranged to slidably extend. The threaded rod 30 is connected at one end to a lever 32 which is keyed to the shaft, and provision is made for rocking the bell crank on the shaft by a nut 34 engaging one surface of the swivel connection and by a hand wheel 36 screwed upon the threaded rod and engaging the opposite surface of the swivel connection. A locking wing nut 38 is provided for locking the parts in adjusted position. With this construction the operator may individually adjust each plate by screwing the nuts 34, 36, 38 upon the threaded rod 30 and thereby rock the bell crank upon the shaft. It is desirable, as will be pointed out, to provide this adjustment in order to control the flow of goods into the bulk stream chamber upon rotation of the feed drum. In order to permit the operator to simultaneously adjust all of the plates of the various units of the machine the shaft 24 is provided at one end thereof with an arm 40, see Fig. 2, and the arm 40 is connected by a vertically extended rod 44, the lower end of which passes freely through a bearing member 45 and is threaded and provided with a nut 46 and hand wheel 47 for effecting vertical movement of the rod. In this manner the operator may simultaneously adjust the position of the various upper plates with respect to a fluted feed drum 49 by vertically moving the rod through manipulation of the nut and hand wheel and rocking the shaft 24, and consequently the bell crank which is secured thereto, through the rod 30 and arm 32 keyed to the shaft.

The lower portion of the front of the U-shaped casting above referred to is closed by a lower plate 50. As illustrated in Fig. 7 the plate 50 is pivotally secured by a rod 52 to the walls of the U-shaped casting and is adjustably secured in different positions by a bolt 53 extended through a slot in an ear 54 formed upon the outer surface of the plate 50. The bolt 53 is arranged to screw into one of the walls of the U-shaped casting. The flow of the goods from the bulk stream chamber through the mouth or discharge orifice is controlled by a gate member 56 secured upon an arm 58 which is arranged to be closed at the completion of each weighing operation. A guide member 59 cooperates with the under surface of the gate and a scraper or wiper 55 cooperates with the upper surface of the gate, as illustrated in Fig. 7.

From the description thus far it will be observed that during the operation of the machine the bulk load is discharged from the bulk stream chamber 12 whenever the gate 56 is withdrawn and that during the period in the operation of the machine that the gate is closed, a succeeding bulk load or portion thereof accumulates within the bulk stream chamber 12, particularly during the continued rotation of the fluted feed drum 49 as the drip stream is being fed through the drip stream chamber 14. The fluted drum 49 is rotated in a counter-clockwise direction, as indicated by the arrow in Fig. 7, and cooperates with the upper end of the partition member 20 to feed the major portion of the material into the chamber 12, while the material remaining in the flutes is deposited into the chamber 14.

Each unit of the machine is provided with a scale beam 60 of any usual or preferred construction having the usual counterweight 62 on one end of the beam, and as herein shown having a bucket 64 suspended upon the second end of the beam and into which the goods are weighed from the bulk and drip stream chambers above described. Provision is made in the illustrated machine for operating the scale beam 60 so as to permit it to perform two weighing operations. The first weighing operation is utilized in weighing into the bucket 64 the primary load and at the end of this weighing operation the gate 56 is arranged to be closed entirely whereupon, at the start of the second cycle the drip stream chamber is opened to weigh in the final increment of the material making up the final load in the bucket. After the completion of the bulk weighing operation during the first cycle, provision is made for resetting the scale and for thereafter permitting the scale to perform its second weighing operation. At the end of the second weighing operation, when final weight has been reached, the gate is again released into a position to close the drip stream chamber, such position being illustrated in Fig. 4.

In the illustrated machine the counterweight is of a predetermined amount corresponding to the total load, and in order to permit the first weighing operation to be performed and the scale beam to operate when a bulk load has been delivered into the bucket and in an amount substantially less than the final or total load the scale beam is provided with a spring 66 cooperating therewith to offset a portion of the counterweight 62. As illustrated in Figs. 4, 5, and 6, each spring 66 is connected at its upper end to a slotted member or plate 68 having a slot therein through which a pin 70 secured to the scale beam is arranged to extend, and during the first weighing operation the tension in the spring is transmitted to the scale beam by the engagement of the upper end of the slotted member 68 with the pin 70. The lower end of each spring is connected to an arm 72 on a cross shaft 74 extended transversely across the entire machine, and the shaft has keyed or otherwise secured to it a second arm 76 having a latching pin 78 adapted to cooperate with the different holes in a segmental bracket 80 secured to the machine frame to thereby enable varying tensions to be placed upon the spring 66 depending upon the amount of the loads upon which the machine is operated. At the end of the first weighing operation, provision is made for disengaging the spring from the scale beam and for permitting the scale beam to operate during the second weighing operation under the influence of the total counterweight 62, and as herein shown the upper end of the slotted plate 68 is provided with a pin 82 which is arranged to extend through a slot formed in a link 84 connected at its upper end to a lever 86 secured to a cross shaft 88 extended transversely across the entire machine. The cross shaft 88 has secured to it a second arm 90 connected by a link 92 to one arm 94 of a bell crank pivoted upon a second cross shaft 96, and a cam roller 98 upon the second arm 100 of the bell crank cooperates with a cam 102 on a cam shaft 104 driven as will be described. Provision is made, as will be described, for rotating the cam shaft 104 and cam 102 to effect the disengagement of the spring 66 from the scale beam 60 in definite relation to the movements of the scale beam. In other words, at the end of the first weighing operation when the scale beam makes its weight and the gate 56 cuts off the supply of material, the cam shaft is arranged to be started in its rotation and permitted to continue for one-half revolution. In this manner the spring is disengaged from the scale beam at a predetermined time after the scale beam completes its first weighing operation. The connection between the link 84 and the slotted piece 68 is as above set forth accomplished by a pin and slot connection, and during the period that the scale beam is performing its first weighing operation, the slotted member 68 will rest against the pin 70 and will in effect counteract a portion of the counterweight 62. At the end of the first weighing operation, when the cam 102 has operated through the linkage above described to lift the slotted piece 68 and remove the spring 66 from its cooperation with the scale beam 60, the pin 70 attached to the scale beam will be disposed centrally of the slot in the slotted piece 68 (to thereby free the scale beam so that the operating mechanism does not interfere with the weighing operation). After the spring 66 has thus been freed from the scale beam 60, the additional effect of the counterweight 62 operates to reset the scale beam without the necessity of more positive resetting operations.

Provision is made for opening the shutter or gate 56 and as herein shown, see Figs. 2 and 20, all the gates are opened simultaneously, at the beginning of each cycle of operation of the machine from a rocker shaft 116. The shaft 116 is rocked by a cam 113 secured to the cam shaft 104 which cooperates with a roller 115 mounted in a lever 117 secured to the rocker shaft 116. Each shutter opening unit is provided with a lever 119 fixed to the shaft 116 and connected to one arm 121 of a bell crank pivoted at 123 in the side of the hopper. The second arm 125 is operatively connected to the shutter arm 58 by a rod 127 and as herein shown the shutter arm is provided with a swivel connection 129 through which the rod 127 is free to slide. A nut 131 on the end of the rod 127 engages the swivel connection to open the shutter. It will be observed that the cam 113 is provided with two lobes 133 and 135, so that during the first cycle or bulk load weighing operation, the lobe 135 will cause the shutter to be opened to its wide open position such as is illustrated in Fig. 2, and during the second cycle or final weighing operation, the lobe 133 will cause the shutter to be partially opened, such as is illustrated in Fig. 7, through the connections described. The roller 115 is held against the cam 113 by a spring 137 connected to a lever 139 secured to the rocker shaft 116. In the operation of the device when the shutter is opened, it is held open by a latching device, as will be described, and during the continued rotation of the cam 113 the connecting rod 127 will slide through the swivel connection 129 to await the next cycle of operation.

Before the scale beam makes its weight during the first weighing operation, the shutter or gate 56 is held in an open position such as is illustrated in Fig. 2 by the engagement of a latch 106 with a notch 108 in the pivoted arm 58 upon which the gate 56 is mounted, the parts being in the position shown in Fig. 2. The latch 106 is pivoted to the hopper and is normally urged into latching position by a spring 110, as shown. The latch is connected by a link 112 to a bell shaped arm 114 free upon the shaft 116 and the connection between the link 112 and the latch 106 is a sliding connection, and a nut 118 on the end of the link is arranged to engage the latch when the bell shaped arm 114 is rocked in a clockwise direction, viewing Fig. 2, as will be described. During the anti-clockwise movement of the bell shaped arm and link, the latter slides freely through the hole in the latch arm 120. As previously stated, the latch 106 remains in latching position to hold the gate 56 in an open position during the first weighing operation and the bell shaped arm 114 is maintained in a position to permit the latch to so function by the cooperation of an anti-friction or roller lock 122 with a hardened plate 124 upon the upper end of the bell-shaped arm. The roller lock is mounted upon one end of a pivoted lever 126, the second end of which is provided with the movable member of a standard form of electro-magnet, indicated generally at 128. As will be described, the electro-magnet 128 is wired to contact members 204 with which a movable contact 206 upon the end of the scale beam 60 cooperates, so that when the scale beam makes its weight at the end of the first weighing operation, the electro-magnet 128 is de-energized, freeing the pivoted lever 126 upon which the roller lock 122 is mounted and thereby enabling the spring 208 attached to the second arm of the bell shaped lever 114 to cause the lever to rotate in a clockwise direction, viewing Fig. 2, thereby through the linkage above described, disengaging the latch 106 from its notch 108 in the supporting plate for the gate and permitting the spring 210 to swing the gate into a position to close both the bulk stream conduit and the drip conduit.

After the first or bulk load weighing operation has been completed and the gate 56 has been operated to cut off both the bulk and drip streams, provision is made for freeing the spring 66 from the scale beam 60 to thereby expose the scale beam to the total counter-weight 62. This is accomplished in the manner above described by the cam 102 at a predetermined time and very shortly after the end of the first or bulk load weighing operation has been completed. A double cam 132 provided on the cam shaft 104, see Fig. 2, cooperates with a cam roller 134 on the bell shaped arm 114 above referred to, to cause the bell shaped arm to swing in a counter-clockwise direction, viewing Fig. 2, and thereby free the latch 106 to permit its spring 110 to cause the latch to return to a latching position. By reference to Fig. 20, it will be seen that the cam 113 upon the cam shaft 104, which normally is utilized to open the gate 56, is also provided with a second rise 133 of a size sufficient to effect movement of the gate from a completely closed position to a position such as is illustrated in Fig. 7, in which the drip stream conduit 14 is opened and the bulk load conduit 12 is closed. When the gate 56 has thus been moved into such position, the latch 106 snaps into and engages the second notch 138 in the gate arm, operating to hold the gate in this position to permit the second or final weighing operation to be completed.

The drip stream then continues to weigh into the bucket 64 until the final weight has been reached, whereupon the scale beam 60 operates upon movement to open the electrical circuit and de-energize the electro-magnet 128, and in the manner above described in connection with the bulk weighing operation to cause the bell shaped lever or arm 114 to swing to the right, operating to disengage the latch from the second notch 138 in the gate arm and permitting the gate arm spring 210 to swing the gate into a position to close or cut off the drip stream.

After the scale has been reset and locked as will be described following the completion of the final weighing operation, provision is made for dumping the material from the weighing bucket 64, and as herein shown this is accomplished by a cam 292 on the cam shaft 104 timed to operate shortly after the resetting operation has been completed and which cooperates with a cam roller 294 on one arm 296 of a bell crank, the second arm 298 of which is connected by a link 300 and through a pin and slot connection 302 to a lever 304 secured to a cross shaft 170 journalled in suitable bearings in the machine frame. The cross shaft 170 is provided with a plurality of gate operating arms 306, one for each unit, and each arm cooperates with a roller 308 on a bell crank 310 pivoted to the side of the weighing bucket 64. The second arm 312 of the bell crank is urged in a counterclockwise direction by a spring 314 and is arranged to be connected to a gate 316 constituting the bottom of the bucket which is pivoted to the side of the bucket, as illustrated. The connection between the second arm 312 of the bell crank and the gate 316 is by a curved arm 318 arranged with respect to the pivot for the bell crank so as to throw in effect a toggle lock when the gate is closed and the second arm of the bell crank reposes against a fixed stop 320 on the side of the bucket. During the operation, when the presser foot or arm 306 engages the roll 308 it operates to break the toggle and through rotation of the bell crank against the spring to effect the pivotal opening of the bottom of the bucket. As long as the arm remains bearing against the roll the gate remains open,
and when permitted to do so by the operating cam 292 the parts are returned to bucket closing position by the spring 314. The forked lever 304 affords a convenient adjustment for varying the throw of the gate operating arms. After the goods leave the bucket they are discharged through the discharge chute 140 into packages or containers 145 positioned beneath the outlets from the discharge chutes, and provision is preferably made for compressing the material within the packages or containers, as will be described. After the goods have been dumped from the bucket 64 after having been weighed, they pass downwardly through the discharge chute 140 into offset portions 142 of the discharge chute, and provision is made for moving individual plungers 144 down through the offset portions of the discharge chutes in order to compress the material within containers 145 positioned beneath the discharge chute, and the individual plungers 144 are mounted upon a crossbar 146 secured at its opposite ends, see Figs. 1 and 27, to slide members 148 arranged to slide vertically upon slides 150 secured to the machine frame, and the plungers and crossbar are lowered as a unit by a pair of operating cams 152, 154, and raised by a third cam 156. The cams 152, 154 cooperate with rollers 158 mounted upon levers 160 secured to the rock shaft 162 and operate to depress the slide members 148. The two cams, 152, 154, identical in operation and construction, see Fig. 22, are provided to equalize or balance the pressure of the plungers 144 when lowered into the containers 145. The rock shaft 162 is provided with a cam lever 164 keyed thereto, having a cam roll 166 cooperating with the third cam 156 and the latter operates to rock the rock shaft 162 to raise the slide members 148 as will be apparent from Figs. 1 and 27.

The cams 152, 154, 156 are all mounted on a one revolution shaft 168, and provision is made for controlling the rotation of this shaft in timed relation to the operation of the buckets 64 controlling the discharge of the material into the discharge chutes 140. Referring to Figs. 3 and 4 the shaft 170 comprises, as above described, the bucket operating shaft, and the shaft is provided with a lever 172 connected by a link 174 to one arm 176 of a bell crank, the second arm 178 of which is connected to one end of a link 180 and the second end of the link is connected to a pawl stop 182. The latter is arranged to be withdrawn from the path if the tail of a pawl 184 mounted on a pawl carrier 186 (see Fig. 22) secured to the cam shaft 168. A ratchet 188 is secured to a sleeve 190 formed as a part of a gear 192 cooperating with a pinion 194 forming part of a compound gear, the second gear 196 cooperating with a pinion 198 connected to the driving pulley 200 and mounted to turn freely on the stud shaft 202. As a result the cam shaft 168 is driven from the pulley 200 through the ratchet 188 and pawl 184, when the pawl stop 182 is withdrawn by the operation of the bucket operating shaft 170 through the connections described.

After the scale beam has made its weight at the end of the final weighing operation, the scale beam of each unit is reset and for this purpose mechanism illustrated in detail in Figs. 2, 13 and 19 is utilized in the illustrated machine. This mechanism includes a contact member herein shown as an adjustable screw 212 secured in a horizontally arranged arm 214 attached to a link or bar 216. The contact member or screw 212 is adapted to engage an abutment 218 upon the scale beam to force the scale beam downwardly against the usual stop 220 when the link 216 is moved downwardly, as will be described. The lower end of the link slides in a bearing 222 attached to the machine frame by a bracket 224. The upper end of the link or bar is arranged to frictionally slide within and through a housing 226 having a friction plug 228 adapted to be forced against the surface of the link or bar by an adjusting screw 230, as illustrated in Fig. 19. The housing 226 is pivotally secured to an arm 232 depending from and secured upon a cross shaft 234, and the cross shaft is arranged to be rocked to raise and lower the parts by the action of a cam 236 mounted on the cam shaft 104 and cooperating with a cam roller 238 on an arm 240 also secured to the shaft 234 and by a spring 242, one end of which is secured to a fixed part of the machine frame. In this manner the cam 236 operates to lift the parts and the spring 242 operates to cause their depression.

Provision is made for elongating the linkage connection when the housing 226 and link 216 are moved upwardly, and for this purpose a block 244 which is clamped to the lower portion of the link engages a bearing 222 so that slippage takes place in the friction connection 228 between the housing and the link during the upward movement of the linkage. When the linkage is moved downwardly the lower end of the link is arranged to engage a stud 246 secured to and upstanding from the scale supporting platen, and on continued downward movement of the linkage slippage occurs in the friction connection between the housing and the link, so that the scale beam is brought down upon its supporting pin in an easy manner, avoiding excessive impact between the scale beam and its supporting pin. In the operation of the machine the scale beams are locked by the cam 236 at the beginning of the first cycle or bulk load period of operation and the cam 236 is designed to hold the scale beams locked for nearly one half a revolution, that is until the initial bulk or load has been deposited in the bucket 64. However, the cam 236 comes to rest on its high part at the end of the half revolution and before the termination of the bulk weighing period so that all the scales are unlocked at this time for the preparation of the weighing operation. The scales remain unlocked during the second one half revolution or drip weighing period, no locking of the scales being necessary at this time because after the spring weight 68 is removed from the weighing end of the beam, the usual counterweight 62 operates to bring the beam back to weighing position.

Provision is made for preventing the operation of the machine after the completion of any cycle of operation thereof until the scale beams of all of the units of the machine have made their weights, and as illustrated in Figs. 2 and 21, the mechanism for accomplishing this includes a pin 250 projecting from one arm 252 of a bell crank free upon the stud 254, and which is positioned to engage the under side of one member 256 of a toggle, so that when the bell crank is rocked in a clockwise direction the pin 250 raises the member 256 of the toggle and operates to withdraw the pawl stop 258 from the path of the tail of a pawl 260 which cooperates with a ratchet 263. The second arm 261 of the bell crank is connected by a link 262 to an arm 264 secured to a cross shaft 266 extending transversely across the machine. Upon the cross shaft 266 is secured a plurality of curved arms 268, one for each unit, and each curved arm is arranged to be disposed within a recess formed in a counterweighted member 270 free to turn upon the cross shaft 266. The counterweighted member 270 is provided with a depending portion 272 shaped to form a recess for a purpose to be described. The lower portion of the depending portion of the counterweighted member provides a bearing surface against which the contact member 274 or stud adjustably secured to the bell shaped arm 114 is adapted to contact when the bell shaped arm occupies its extreme position to the left, viewing Fig. 2. As each scale beam makes its weight, the bell shaped arm of each unit is rocked to the right, viewing Fig. 2, but until all of the bell shaped arms of the various units have been rocked to the right, the depending portion of the counterweighted member 270 of any particular unit which has not made its weight will be held in a position to prevent the cross shaft 266 from being rocked. When, however, all of the units have made their weights, then the weight of the parts and particularly of the counterweights of the various counterweighted members operates through the engagement of the counterweight with the curved arms 268 to rock the shaft 266 and consequently withdraw the pawl stop 258 from the path of the pawl 260, placing the machine in condition to operate, providing the other conditions to be described are fulfilled.

In the event that any unit of the machine operates during any cycle to introduce into the buckets 64 an overload during the first part of the weighing operation, as for example, when an excessive bulk load is thus introduced, provision is made for stopping the machine at the end of that cycle and preventing the next cycle of operation of the machine from continuing. For this purpose I may provide any usual or preferred form of overload safety device, and in Figs. 16, 17, 18 and 21 I have illustrated one form of such mechanism. As therein shown the cam shaft 104 is provided with an operating cam 276 adapted to cooperate with a cam roll 278 at the end of a lever 280 pivotally mounted upon a second lever 284 secured to a cross shaft 282. The levers 282, 284 normally act as one arm being held in an extended position by suitable stop lugs and a spring 286 as shown. However, under certain conditions of operation, as will be described, the arm 280 is permitted to yield, as shown in Fig. 18. The cross shaft 282 is also provided with a series of latch members 288, one for each unit of the machine, secured to the cross shaft 282, and these latch members are arranged to cooperate with the depending portions of the counterweight members 270 above referred to. Referring now to Figs. 16, 17 and 18, it will be observed that at the first weighing cycle of operation of the machine the cam 276 operates to move the latch member 288 through rocking of the rock shaft 282 from the position shown in Fig. 16 to that shown in Fig. 17, unless the scale has balanced prematurely, in which case the latch member will have caught in the recess 290 in the depending portion of the counterweight member, so that as the cam continues to revolve, the end of the cam arm 280 pivots into the position shown in Fig. 18, the spring 286 yielding at this time. The latch member 288 holds the cross shaft 266 from rocking and prevents the machine from being started upon its next cycle of operation. Referring now to Fig. 10, a second pawl 259, is provided which is arranged to engage the teeth of a second ratchet 265 at the end of each revolution of the clutch to prevent the reversal or backlash of the driving members when the pawl stops are actuated. Normally the pawl 259 is disengaged by a roll 267 mounted on a lever 269 which is also urged into a depression 271 in the disc 385 by a spring 273.

The weighing machine is driven from a motor 322, as best shown in Fig. 3, through connections including a belt 324, a pulley 326 on the motor shaft 328, and large pulley 200 on the countershaft 202. The countershaft 202 is also provided with a smaller pulley 334 which is connected by a belt 336 to a pulley 338 on a drive shaft 340. Provision is made for driving the fluted feeding drum 49 in the same direction but at different speeds from the drive shaft 340. In the operation of the machine the fluted feed drum 49 is rotated at a relatively high speed during the first or bulk weighing operation, and then its speed is automatically reduced, herein shown to half its high speed when the second or final weighing operation is taking place. As shown in Fig. 2, the feed drum is connected by sprockets 342, 344 and a chain 345 to a hopper drive shaft 346, and the latter is arranged to be driven from the driving shaft 340 at either high or low speeds by two independent sets of gear trains arranged to be automatically connected at the proper time in the operation of the machine to the drive shaft 340 by clutch members indicated generally at 347. Referring now to Figs. 9 and 11, the drive shaft 340 is provided with a pinion 348 fast thereon which is arranged to mesh with an idler gear 350 and drives therethrough to a spur gear 352 mounted upon a sleeve 354 free on the cam shaft 104. The sleeve is thus driven continuously from the drive shaft 340 and the sleeve is provided with a movable double clutch member 356 arranged to slide thereon but to be rotated thereby, as for example, by the usual key 358 and keyway. The double clutch member 356, as herein shown, is provided with teeth on the opposite surfaces thereof, and when moved to the right, viewing Fig. 9, is arranged to engage the driven member 360 of a clutch having a gear 362 formed integrally therewith. The gear 362 is arranged to mesh with a larger gear 364 upon the hopper drive shaft 346, and through connections described, when the clutch member is moved to the right, the rotations of the sleeve are transmitted through the clutch and thence through the gears to the hopper drive shaft. When the movable clutch member is moved to the left, viewing Fig. 9, the teeth upon the left-hand surface thereof cooperate with the teeth of a driven member 366 of a second clutch. The driven member is provided with a gear 368 formed integrally therewith arranged to mesh with a second gear 370 secured on the hopper drive shaft 346. The gearing ratio between the gears 362, 364, 368, 370, is such that when the clutch 356 is moved to the left the hopper drive shaft 346 is rotated at relatively high speed, and when the clutch 356 is moved to the right, the hopper drive shaft 346 is driven at a reduced speed, and as herein shown, at one-half speed. Provision is made for automatically shifting or moving the movable member of the clutch from engagement first to the left and then to the right to engage the respective driven members of the two clutches, and as herein shown a cam 372 fixed on the cam shaft 104 cooperates with a cam roller 374 on a bell crank 376, the second arm 378 of which is connected by a spring 380 to a fixed part of the machine frame and the bell crank is provided with a depending portion comprising a yoke 382 arranged to straddle the movable member of the clutch and the peak connected thereto by the usual pivot pins 384, so that upon oscillation of the bell crank by the cam the desired movements may be imparted to the movable member of the clutch to drive the hopper drive shaft, first at high speed and then at low speed. Provision is made for starting the rotation of the fluted feed drum 49 at the beginning of each cycle of operation of the machine and for stopping the rotation when the scale has made its weight. As herein shown, see Figs. 7 and 13, the sprocket 344 is provided with clutch teeth 351 and forms the driven member 353 of a clutch slidably keyed to the shaft 346 and the driven member 353 is arranged to engage the teeth 355 of a driving member 357 of the clutch which is keyed fast to the shaft 346. As herein illustrated the clutch is operated by the movement of the arm 114, through a bell crank 359, pivoted at 361, one arm 363 of which is forked to receive the driven member 353 of the clutch and the second arm 365 of which is provided with a bearing surface 367 which cooperates with a screw 369 extending from the arm 114. A depending extension 371 on the second arm 365 is provided with a spring stud 373 and a spring 375 connected to a stud 377 in the arm 114 yieldingly urges the levers 114 and 365 together. When the scale has made its weight at each cycle of operation, the lever 114 is released, as hereinbefore described, and as illustrated in Fig. 13, this action will pivot the bell crank 359 counter-clockwise to disengage the clutch members 353, 357. When the lever 114 is reset, the spring 375 will cause the bell crank 359 to pivot clockwise and yieldingly urge the clutch members 353 and 357 into engagement to drive the fluted drum 49. It will therefore be seen that material is fed through the hopper chamber 12, 14 only when the lever 114 is in its locked position and while the scale is weighing.

From the description thus far, it will be observed that in the operation of the machine at the end of any cycle of operation the scale beam will have been unlocked and placed in a condition ready to weigh. When starting the machine the pawl stop 258 is withdrawn preferably by manual movement of one arm 248 of the toggle through the operator raising the starting rod 249. The pawl stop 258 is withdrawn from the path of the pawl 260 mounted upon a pawl carrier 385 having a gear 386 secured thereto, see Fig. 12, which is arranged to mesh with a gear 388 upon the cam shaft 104. In the illustrated machine, the ratio of gearing between the gears 386, 388 is such as to cause the cam shaft 104 to revolve through a half revolution at each revolution of the pawl carrier 385 and as previously pointed out each half revolution of the cam shaft is equivalent to one cycle of operation. Provision is made, as has been described, for opening the gates 56 to permit the introduction of the bulk load into the weighing bucket, and this operation is performed through mechanism including a gate opening cam 113, see Fig. 20, upon the cam shaft 104. When the scale beam has made its first weight, the gate is permitted to close as above described, and is then reopened to initiate the drip stream from the drip conduit while maintaining the bulk load conduit closed. During the half revolution of the cam shaft the spring 66 is detached from the scale beam 60, thereby causing the entire counterweight 62 to be free to depress the counterweight end of the scale beam, and accordingly it is unnecessary to positively lock the scale beam at this time. During continued operation of the machine the drip stream continues to fall into the weighing bucket 64 until this final weight is reached, and upon completion of the second weighing operation the pawl stop 258 is withdrawn from the pawl 260 and the cam shaft 104 is permitted to make an additional one-half revolution, operating to permit the gate to close the drip stream conduit. The rotation of the cam shaft during the first cycle is utilized in the manner above described to open the bottom of the bucket, discharging the material into the discharge chute and also to reconnect the spring with the scale beam in the manner above described.

Referring now to Fig. 21, it will be observed that the machine is provided with two pawl stops arranged to be inserted into the path of the tail of the single pawl 260 controlling the starting and stopping of the machine. One of the pawl stops 258 as previously described is connected with a hand control lever 390, and is adapted to be withdrawn from the path of the tail of the pawl by hand. However, in order to start the machine it is necessary that the second pawl stop 392 be also withdrawn from the path of the tail of the pawl 260, and one of the toggle arms 394 is connected by a link 396 to an arm 398 on a cross shaft 400 and the latter has secured to it a second arm 402 provided with a roll 404 which is adapted to slip into a recess 406 in a disk 408 formed upon one end of a hub 410 secured at its upper end to a rotary container engaging member 412. The latter as herein shown comprises a star wheel provided with six points, one for each weighing unit. The locking roll 404 is urged against the disk 408 and caused to enter the recess 406 in the periphery thereof by a spring 414, see Fig. 23, and is arranged to be withdrawn simultaneously with the withdrawal of a positive lock for the disk and star wheel by the rocking of the shaft 416 from a cam 418 through a cam roll 420 mounted upon a lever 422 clamped to the shaft 416. The shaft 416 has secured to it a short arm 424 arranged to engage a pin 426 on a short arm 428 secured to the shaft 400. The shaft 416 is also provided with a locking lever, 432, the end of which is upturned and arranged to cooperate with a lug 434 on the underside of the disk 408 to positively lock the star wheel 412 and parts from being rotated by the engagement with the containers as the latter are urged forwardly by the operation of the conveyor, as will be described. When the shaft 416 is rotated to withdraw the locking member 432 from the lug 434 on the underside of the disk 408 and also to withdraw the supplemental locking roll 404 from its recess 406, provision is made for preventing the operation of the weighing mechanism of the machine. When the shaft 400 is rocked by the operation of the cam 418 and engagement of the arm 424 with the pin 426, the second pawl stop 392 is moved into the path of the pawl 260 through the connections described, namely; the arm 398 secured to the shaft 400; link 396; and toggle arms 394, 395, thus preventing the weighing machine from starting in operation during the container moving operation. When the locking mechanism, including the supplemental locking roll 404 is moved into the recess 406 in the disk 408 the reverse operation takes place and the spring 414 operates through the link 396 to break the toggle upwardly, withdrawing the second pawl stop 392 from the path of the tail of the pawl and permitting the weighing mechanism to operate. Thus the weighing mechanism cannot start until both the predetermined and entire number of filled packages corresponding to the number of units in the machine, have been removed from, and in addition a similar number of empty packages properly positioned, beneath, the discharge chutes from the various units of the machine. The packages are moved through the machine by a conveyor herein shown as comprising a pair of spaced narrow belts 500, 502 running over pulleys 504, 505, one of which is driven by a chain 506 from a driving sprocket 508 attached to the gear 192 (Fig. 22). The chain 506 runs over a driven sprocket 510 on the end of a stud shaft 512, and the latter is connected by gears 514, 518 to a second stud shaft 516 connected by bevel gears 520, 522 to the pulley shaft 524. Provision is made for elevating the containers, when in filling positions, to thereby lift them from the belts during the plunging operation above described, and also in order to assist in providing a tight joint between the mouth of the containers 145 and the discharge chutes 142. As herein shown, an operating lever 526 free on the rock shaft 162 is arranged to be rocked by a cam 528 and cam roll 530, and spring 532 and is connected by a connecting rod 534 to one arm of a bell crank 536, the second arm 538 of which is connected by a link 540 to an elevator bar 542 engaging the bottom of the containers and which is capable of passing between the narrow belts 500, 502 of the conveyor. A similar linkage, lever 545 and link 546, is provided at the other end of the elevator bar 542, and two linkages being connected together by a connecting rod 544 and levers 541, 543 secured to the shafts 547, 549. As a result of the four bar linkage produced, substantially straight line motion is imparted to the elevator bar 542. The arms 538, 545 and links 540, 546 cooperate to form in effect toggles to withstand the plunging pressure. As illustrated, the spring 532 serves to elevate the elevator bar 542 and the cam 528 to break the toggles to depress the elevator bar.

Any usual or preferred form of electrical contact may be utilized in connecting the electro-magnets 128 for operating the machine when the scale beam 60 makes its weight. As illustrated in Figs. 14 and 15, the several contact members upon the end of the scale beams 60 and the corresponding electro-magnets are arranged in parallel between the usual power lines, and the arrangement of contact members is such that when the scale beams make their weights they open the circuits at the contact members 204, operating to de-energize the electro-magnets 128 and permitting the operating arms 126 to drop under the influence of the heavy coil springs 208 connected to the bell shaped arms 114 above described. Inasmuch as the details of the contact members form no part of the present invention, further description thereof is deemed unnecessary.

Briefly, the operation of the illustrated machine may be summarized as follows: Assuming that the machine is supplied with material and all the scales are in readiness for weighing, the operator lifts the starting lever 249 to withdraw the manually operated pawl stop 258. This action will start the first cycle of operation, permitting the cam shaft 104 to make one half a revolution. The order of events as they occur is as follows: Each previously weighed load in the bucket 64 is emptied into the containers 145, the lever 306 functioning to open the gate 316; the scale beam is immediately reset by the scale locking cam 236 preparatory to receiving a bulk load from the hopper; the operating lever 114 is reset to its locked position as illustrated in Fig. 2 which automatically starts the fluted feeding drum 49; the shutter 56 is opened to its wide open position as shown in Fig. 2 and releases its accumulated contents into the bucket 64; the scale locking mechanism is released to free the scale beam for weighing directly after the accumulated load is dumped; and the spring weight 66 is exerting its influence on the weighing end of the scale beam 60. The fluted drum 49 continues to feed material into the bucket 64 until the scale is overbalanced, whereupon the circuit to the magnetic coil 128 is opened and the lever 114 is released to unlatch the shutter 56 and throw out the clutch 353, 357, to stop the rotation of the feeding drum 49. When all the scales have made their weights, the pawl stop 258 is withdrawn to permit the pawl and ratchet clutch 260, 263 to make another revolution and rotate the cam shaft 104 one half a revolution for the second cycle of the weighing operation. During the second cycle, the lever 114 is again reset and the fluted drum 49 is rotated to feed material at a reduced speed. The scale beam is relieved of its spring weight 66 and again assumes weighing position to receive the drip stream or finished weight from the hopper. During the second cycle the shutter 56 is partially opened to permit goods to flow from the drip chamber 14 while the bulk chamber 12 accumulates material for the succeeding weighing operation. The drip stream continues to flow until the scale has made its weight whereupon the electrical circuit to the coil 122 is again opened to release the lever 114 and the shutter 56 is again closed and the fluted drum stops its rotation. When all the scales have made their weights the controlling mechanism again operates to remove the pawl stop 258 from the one revolution clutch 260, 263, and a new cycle of operation is started as above described.

The operation of the plungers 144 and the feeding of a new set of containers 145 into the machine is initiated at the beginning of the first cycle of operations by withdrawal of the pawl stop 182 from the plunger operating clutch 184, 188 and the latter mechanism is so timed that the plungers 144 follow the material directly after the dumping operation. The plungers then return to their normal positions and the elevated containers are lowered to the moving conveyor belts 500, 502 which carry the filled set of containers away and advance a new set into position to receive the material when the buckets 64 are again opened. When the containers have been thus positioned the pawl stop connection 396 from the conveyor withdraws the second pawl stop 392 and the machine is in readiness for its second cycle of operations.

While the preferred embodiment of the invention has been herein illustrated and described, it will be understood that the invention may be embodied in other forms within the scope of the following claims.

Having thus described the invention what is claimed is:

1. In a weighing machine, in combination, a scale including a scale beam, means for delivering a bulk stream and a drip stream onto the scale, means for counter-balancing the scale beam so that said scale beam will be depressed when a predetermined weight of material has been deposited thereon, control mechanism actuated by one depression of the scale beam to entirely cut off the bulk stream and thereafter start the delivery of the drip stream, said control mechanism being actuated by alternate depressions of the scale beam to entirely stop the drip stream and thereafter start the bulk stream and means for increasing the effective counter-balance of the scale beam after the bulk weighing whereby the scale beam is returned to its pre-depressed position to weigh the next drip load.

2. A weighing machine having, in combination, material feeding means including means for delivering a bulk stream and a drip stream, a scale including a scale beam onto which the material is delivered to perform the weighing operation, means for controlling the flow of material onto the scale operatively connected with the scale beam to cut off both the bulk and the drip streams when the scale beam has been moved from an initial position through a predetermined movement, means for increasing the effective counterweight by a predetermined amount when a predetermined point has been reached in the movement of the scale beam whereby to permit the scale beam to return to its initial position, means operatively connected with said flow controlling means for initiating the flow of the drip stream when the effective counterweight is increased, said flow controlling means being operative to cut off said drip stream when the scale beam has been moved through a predetermined amount of movement.

3. A weighing machine having, in combination, material feeding means for delivering a bulk stream and a drip stream, a scale including a scale beam onto which the material is delivered to perform the weighing operation, means for controlling the flow of material onto the scale operatively connected with the scale beam to cut off both the bulk and the drip streams when the scale beam has been moved from an initial position through a predetermined movement, means for increasing the effective counter-weight by a predetermined amount when a predetermined point has been reached in the movement of the scale beam whereby to permit the scale beam to return to its initial position, means operatively connected with said flow controlling means for initiating the flow of the drip stream when the effective counterweight is increased, said flow controlling means being operative to cut off said drip stream when the scale beam has been moved through a predetermined amount of movement, and means for automatically initiating said bulk and drip streams at the start of the next cycle of operation of the machine.

4. A weighing machine having, in combination, a scale including a scale beam provided with a counterweight, means for delivering a bulk stream and a drip stream onto the weighing end of the scale, a spring cooperating with the scale beam during one portion of its weighing movement for decreasing the effect of the counterweight upon the scale beam by a predetermined amount, means for cutting off the flow of both the bulk stream and the drip stream when the scale beam has moved into predetermined position, means rendered operative by the movement of the scale beam into such predetermined position for removing the effect of the spring from the scale beam, whereby to increase the effective counterweight and permit the scale beam to return to its initial position, and means operatively connected with said flow cut-off means for initiating the flow of the drip stream when the effective counterweight is increased, said flow cut-off means being operative to cut off the drip stream upon another movement of the scale beam.

5. A weighing machine having, in combination, a scale including a scale beam provided with a counterweight, means for delivering a bulk stream and a drip stream onto the weighing end of the scale, a spring cooperating with the scale beam during one portion of its weighing movement for decreasing the effect of the counterweight upon the scale beam by a predetermined amount, means for cutting off the flow of both the bulk stream and the drip stream when the scale beam has moved into predetermined position, means rendered operative by the movement of the scale beam into such predetermined position for removing the effect of the spring from the scale beam, whereby to increase the effective counterweight and permit the scale beam to return to its initial position, means operatively connected with said flow cut-off means for initiating the flow of the drip stream when the effective counterweight is increased, said flow cut-off means being operative to cut off the drip stream upon another predetermined amount of weighing movement of the scale beam, and means for automatically initiating the bulk and drip streams.

6. A weighing machine having, in combination, a plurality of weighing units, each including a scale including a scale beam, material feeding means including means for feeding a bulk stream, and means for feeding a drip stream onto the weighing end of the scale, means for increasing the effective counterweight when the weighing end of the scale beam has moved through a predetermined downward movement, whereby to permit the scale beam to return to its initial position, means rendered operative by said downward movement for cutting off both the bulk and the drip streams and for initiating the flow of said drip stream when the effective counterweight is increased, means for cutting off the drip stream when the weighing end of the scale beam has moved through another downward movement, and manually operated means operatively connected to said counterweight increasing means for simultaneously adjustably varying the effective counterweights of the several scale beams.

7. A weighing machine of the type operating in bulk and drip stream cycles having, in combination, a scale including a scale beam provided with a counterweight for one of said cycles, material feeding means, means for increasing the effective counterweight during the other cycle to permit said scale beam to return to its initial position after said one cycle, and mechanically operated means controlling the operation of said last mentioned means to permit it to decrease the effective counterweight to its initial value during a succeeding cycle of operation, said controlling means being operative in timed relation to the weighing operation.

8. A weighing machine having, in combination, a scale including a scale beam, material feeding means including means for feeding a bulk stream, and means for feeding a drip stream onto the weighing end of the scale, mechanically operated means for increasing the effective counterweight when the weighing end of the scale beam has moved through a predetermined downward movement to return the scale to its initial position, means rendered operative by said downward movement for cutting off both the bulk stream and the drip stream and for initiating the flow of said drip stream when the effective counterweight is increased, means for cutting off the drip stream when the weighing end of the scale beam has moved through another downward movement, and manually operated means operatively connected to said counterweight increasing means for adjustably varying the effective counterweight.

9. A weighing machine having, in combination, a scale including a scale beam provided with a counterweight, material feeding means for feeding a bulk stream and a drip stream onto the scale, an intermittently rotating control shaft, means controlled by the scale beam for initiating the rotation of said intermittently rotating control shaft to start each cycle of operation of the machine, means operatively connecting said control shaft and said material feeding means whereby the latter is caused to feed a bulk stream during one cycle of operation and a drip stream during the second cycle of operation, and means for increasing the effective counterweight during the second cycle of operation when the scale beam has moved through a definite increment of movement, said last named means being operatively connected to and controlled by said intermittently rotating control shaft.

10. In a weighing machine, in combination, a scale including a scale beam, a bulk stream conduit, a drip stream conduit, and a single feeding member comprising a fluted drum for delivering material into the bulk and drip stream conduits and onto said scale, said conduits being arranged adjacent to one another and with relation to said fluted drum whereby the material being delivered from both conduits merge so as to form a single combine stream during one period of operation of the machine and means for cutting off the bulk stream whereby a reduced stream of material is formed during another period of operation of the machine.

11. In a weighing machine, in combination, a scale including a scale beam, a drip stream conduit, a bulk stream conduit, a single driven feed member comprising a fluted drum for supplying material to both conduits and onto said scale, said conduits being arranged adjacent to one another and with relation to said fluted drum whereby the bulk stream and the drip stream are merged during one period of operation, means for cutting off the merged stream of material, said last named means being operative to permit the drip stream alone to flow onto the scale during another portion of operation, said fluted drum being operative to accumulate a portion of the next succeeding bulk load in the bulk stream conduit during the interval that the drip stream alone is being delivered onto the scale beam.

12. In a weighing machine, in combination, a scale including a scale beam, a drip stream conduit, a bulk stream conduit, positively operated means including a fluted drum for supplying material to both conduits and onto said scale, said conduits being arranged adjacent to one another and with relation to said fluted drum whereby the bulk stream and the drip stream are merged during one period of operation, means for cutting off the merged stream of material, said last named means being operative to permit the drip stream alone to flow onto the scale during another portion of operation, said material supplying means being operative to accumulate a portion of the next succeeding bulk load in the bulk stream conduit during the interval that the drip stream alone is being delivered onto the scale.

13. In a weighing machine, in combination, a scale including a scale beam, a drip stream conduit, a bulk stream conduit, positively operated means including a fluted drum for supplying material to both conduits and onto said scale, said conduits being arranged adjacent to one another and with relation to said fluted drum whereby the bulk stream and the drip stream are merged during one period of operation, means for cutting off the merged stream of material, said last named being operative to permit the drip stream alone to flow onto the scale during another portion of operation, said material supplying means being operative to accumulate a portion of the next succeeding bulk load in the bulk stream conduit during the interval that the drip stream alone is being delivered onto the scale, means for cutting off the drip stream, and means for thereupon terminating the operation of said positively operated material supplying means.

14. In a weighing machine, in combination, a scale including a scale beam provided with a counterweight, means for delivering a bulk stream and a drip stream onto the scale, means for varying the effective counterweight so that said scale beam will be depressed when a predetermined weight of material has been deposited thereon, and control mechanism actuated by one depression of the scale beam to entirely cut off the bulk stream, increase the effective counterweight to return the beam to its initial position, and thereafter start the delivery of the drip stream and actuated by alternate depressions of the scale beam to entirely stop the drip stream, decrease the effective counterweight and thereafter start the delivery of the bulk stream.

15. In a weighing machine, in combination, a scale including a scale beam, material feeding means including a rotatable drum for feeding material to said scale, and means for operating said drum, means under the control of the scale beam for cutting off the flow of the material fed by the drum, said means including an electromagnet, a flow cut-off, a pivoted arm adapted to be held in one position by the electro-magnet and provided with an anti-friction roller, a movable actuating member co-operating with said roller to be locked thereby in one position of the pivoted arm, when said electro-magnet is energized, and to pass said roller in another position of the pivoted arm when said electro-magnet is deenergized, said actuating member being operatively connected to said flow cut-off, and connections between said actuating member and the drum operating means for controlling the operation of the latter.

16. In a weighing machine, in combination, a scale including a scale beam, material feeding means for simultaneously forming separate bulk and drip streams and feeding the merged bulk and drip stream onto the weighing end of the scale, means including a spring-closed gate for entirely terminating the delivery of the merged stream onto the scale, operating means including a cam operative to open said gate for initiating the delivery of the drip stream, means for thereafter releasing said spring-closed gate to entirely terminate the delivery of the drip stream onto the scale, and control means operatively connected with the scale beam and said releasing means for terminating the delivery of the merged bulk and drip streams when the scale beam has moved through a predetermined movement and for terminating the delivery of the drip stream when said scale beam has moved through another predetermined movement.

17. In a weighing machine, in combination, a scale including a scale beam, material feeding means for simultaneously forming separate bulk and drip streams and feeding the merged bulk and drip stream onto the weighing end of the scale, means including a spring-closed gate for entirely terminating the delivery of the merged stream onto the scale, operating means including a cam for opening said gate for initiating the delivery of the drip stream, means for thereafter releasing said spring-closed gate to entirely terminate the delivery of the drip stream onto the scale, and control means operatively connected with the scale beam and said releasing means for terminating the delivery of the merged bulk and drip streams when the scale beam has moved through a predetermined movement and for terminating the delivery of the drip stream when said scale beam has moved through another predetermined movement, and means for resetting said scale beam between successive movements.

STANLEY R. HOWARD.